United States Patent [19]

Banno et al.

[11] Patent Number: 5,695,236
[45] Date of Patent: Dec. 9, 1997

[54] GLASS PLATE HOLDING DEVICE

[75] Inventors: Yoshikazu Banno, Nagoya; Hiroyuki Maruoka, Tokyo, both of Japan

[73] Assignee: Nifco Inc., Yokohama, Japan

[21] Appl. No.: 621,617

[22] Filed: Mar. 26, 1996

[30] Foreign Application Priority Data

May 16, 1995 [JP] Japan .................. 7-117427

[51] Int. Cl.⁶ ............................................. B60J 1/00
[52] U.S. Cl. ................... 296/96.21; 296/201; 52/208
[58] Field of Search ............................. 296/96.21, 201; 52/208, 511

[56] References Cited

U.S. PATENT DOCUMENTS 4,591,203  5/1986  Furman ................. 296/96.21 X
4,712,341  12/1987 Harris, Jr. et al. ........ 296/96.21 X

FOREIGN PATENT DOCUMENTS 0304694  3/1989  European Pat. Off. ........ 296/96.21

Primary Examiner—Joseph D. Pape
Attorney, Agent, or Firm—Kanesaka & Takeuchi

[57] ABSTRACT

A glass plate holding device is used for holding a glass plate or a window glass to an opening of, for example, an automobile when the glass plate is fixed to the opening. The holding device is formed of a base plate to be attached to the glass plate, a leg fixed to the base plate at a base end and projecting in a direction away from the base plate, and a pawl formed at a forward end of the leg. The pawl enters into a mounting hole provided in a flange for the opening and engages an edge of the mounting hole to prevent the glass plate from being lifted.

8 Claims, 6 Drawing Sheets

GLASS PLATE HOLDING DEVICE

BACKGROUND OF THE INVENTION AND RELATED ART STATEMENT

The present invention relates to a glass plate holding device for holding a glass plate, such as a window pane, in an opening of, for example, an automobile until an adhesive is cured when the glass plate is fixed to the opening of the automobile by the adhesive.

As shown in FIGS. 8 and 9, a glass plate or window glass W is fixed to an opening 60 of an automobile M by an adhesive. Retainers 62 with an L-shape are attached to an upper edge of the glass plate W, and are hung in mounting holes 66 provided in a flange 64 for the opening 60. In this condition, the glass plate W is tentatively held until the adhesive is cured or hardened (Japanese Utility Model Publication (KOKAI) No. 1-68914).

However, at the time of assembling of the automobile, when a door of the automobile is opened and closed, an inner pressure in an interior of the automobile may increase. However, in a structure of the conventional retainer 62, since a portion of the retainer 62 is only inserted into the mounting hole 66, the glass plate is not prevented from being lifted.

Accordingly, one object of the invention is to provide a glass plate holding device for preventing a glass plate from moving when the glass plate is fixed to the flange.

Another object of the invention is to provide a glass plate holding device as stated above, wherein the lifting of the glass plate is prevented until an adhesive is hardened.

A further object of the invention is to provide a glass plate holding device as stated above, which can be easily and economically manufactured.

Further objects and advantages of the invention will be apparent from the following description of the invention.

SUMMARY OF THE INVENTION

In a glass plate holding device according to a first aspect of the invention, a glass plate is held in an opening. For example, a window glass is tentatively held in an opening of an automobile. The holding device is formed of a base plate to be attached to the glass plate; a leg extending perpendicularly from the base plate; and a pawl provided at a forward end of the leg so that the pawl is inserted into a mounting hole provided in a flange for the opening and is engaged therewith to thereby prevent the glass plate from being lifted or moved upwardly even if a pressure is applied to the glass plate.

In a glass plate holding device according to a second aspect of the invention, the holding device is formed of a base plate to be attached to the glass plate; a leg extending perpendicularly from the base plate; a pawl or pawl piece extending diagonally from a forward end of the leg toward the base plate; and a step portion formed at a forward edge of the pawl piece. The step portion engages a hole edge of a mounting hole provided in a flange for the opening to thereby prevent the glass plate from being lifted even if a pressure is applied to the glass plate.

In a glass plate holding device according to a third aspect of the invention, at least one pressing member is provided at a base end portion of the leg. The pressing member abuts against a forward edge of a projecting portion of the flange for the opening when the leg is inserted into the mounting hole.

In a glass plate holding device according to a fourth aspect of the invention, the mounting hole extends from the flange for the opening to a middle portion of the projecting portion projecting from the flange toward the glass plate.

In the glass plate holding device according to the first aspect, the glass plate is tentatively held under a condition where the glass plate is fitted to the opening.

The base plate for constituting the glass plate holding device is attached to the glass plate. The leg extends substantially perpendicularly from the base plate, and the pawl is formed at the forward end of the leg.

When the glass plate or window glass is fitted into the opening of an automobile, the pawl enters into the mounting hole provided in the flange of the automobile and engages thereat, so that the glass plate is prevented from being moved or lifted even if a pressure is applied thereto. Namely, even if an inner pressure in an interior of the automobile is increased by opening and closing a door, the glass plate is not lifted and is fixed to an accurate position by the adhesive.

In the glass plate holding device according to the second aspect, the pawl or pawl piece diagonally extends from the forward end of the leg toward the base plate, and the step portion is formed at the forward end of the pawl piece.

In this respect, when the leg is inserted into the mounting hole, the pawl piece is bent by touching a hole edge. It requires a force to insert the leg into the mounting hole, but in the invention, a small amount of inserting force is required when the leg is inserted into the mounting hole. Also, after the pawl piece passes through the mounting hole, the pawl piece returns to the original posture by elasticity, by which the step portion provided at the forward edge of the pawl piece engages the hole edge. Accordingly, an extracting force required for removing the leg from the mounting hole is increased to thereby positively prevent the glass plate from being moved or lifted.

In the glass plate holding device of the third aspect, in a condition where the leg is inserted into the mounting hole, the pressing member provided at the base end portion of the leg abuts against the forward edge of the projecting portion. More specifically, since an upper circumferential edge portion of the glass plate is supported by the pressing member, the glass plate does not fall or slip down by its own weight. Also, since the glass plate is supported by the base end portion of the leg, a resistance against the slipping of the glass plate is large.

In the glass plate holding device according to the fourth aspect, the mounting hole extends to a portion of the projecting portion projecting from the flange toward the glass plate. Therefore, a position where the pawl is engaged with the hole edge of the mounting hole is located close to the glass plate. Thus, a length of the leg can be shortened to thereby improve the strength of the whole glass plate holding device.

DETAILED DESCRIPTION OF PREFERRED EMBODIMENTS

Figure 1:
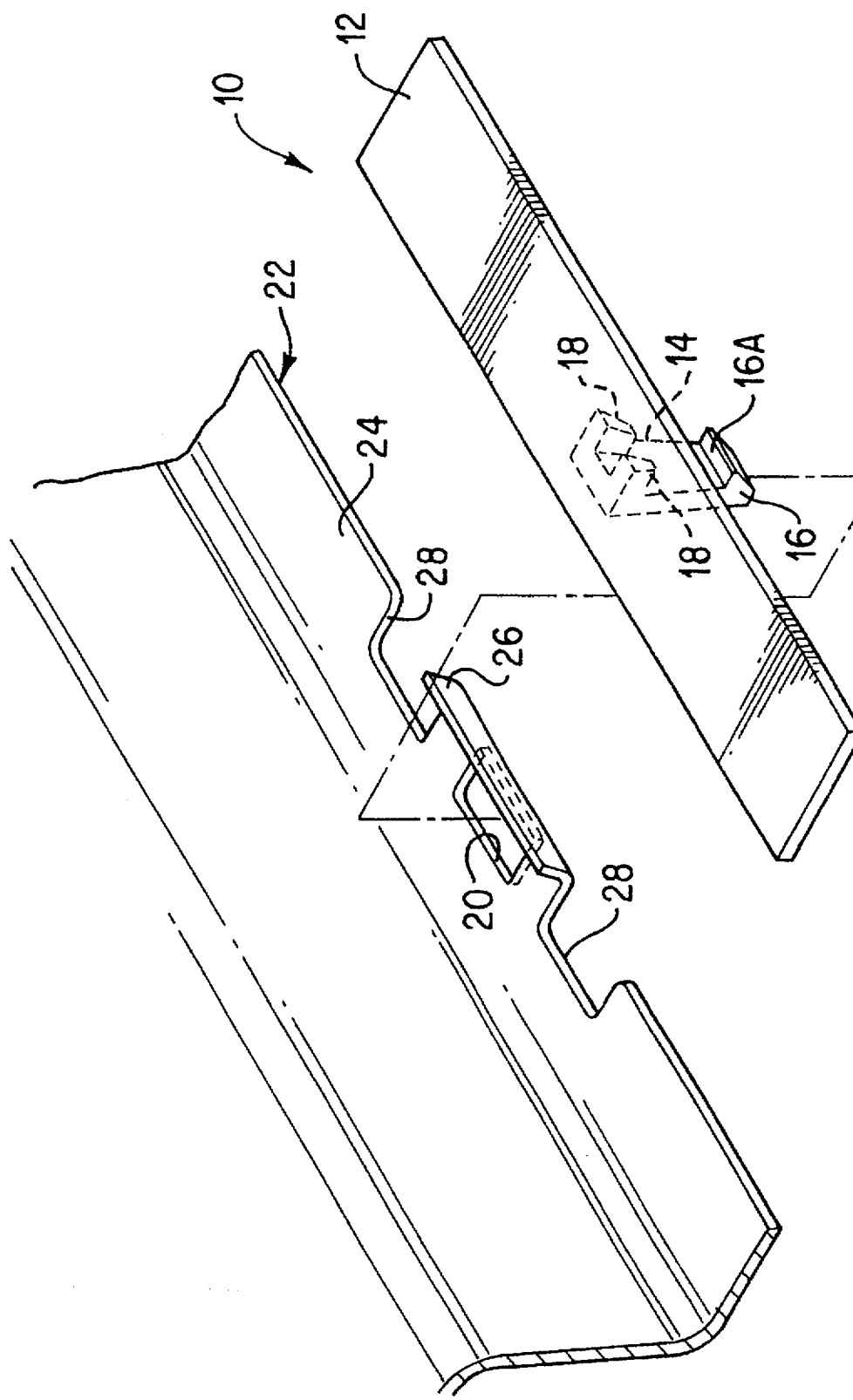
FIG. 1 is a perspective view for showing a relationship between a glass plate holding device and an opening of an automobile according to a first embodiment of the invention.
Figure 2:
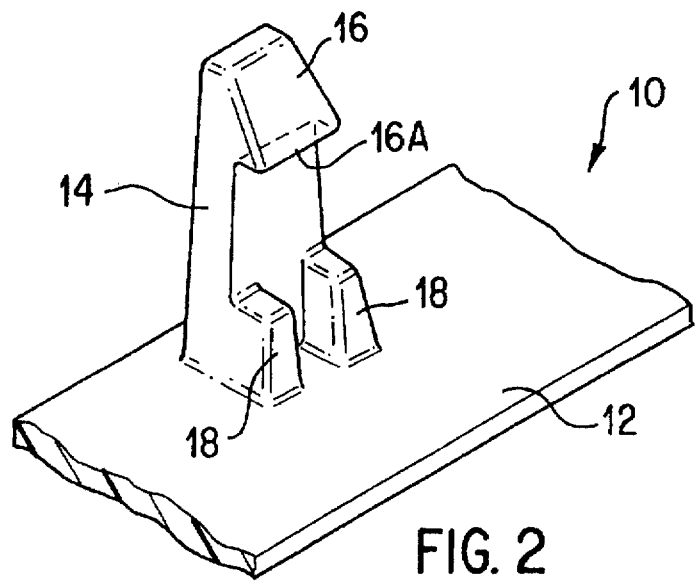
FIG. 2 is a perspective view for showing a leg of the glass plate holding device according to the first embodiment.
Figure 3:
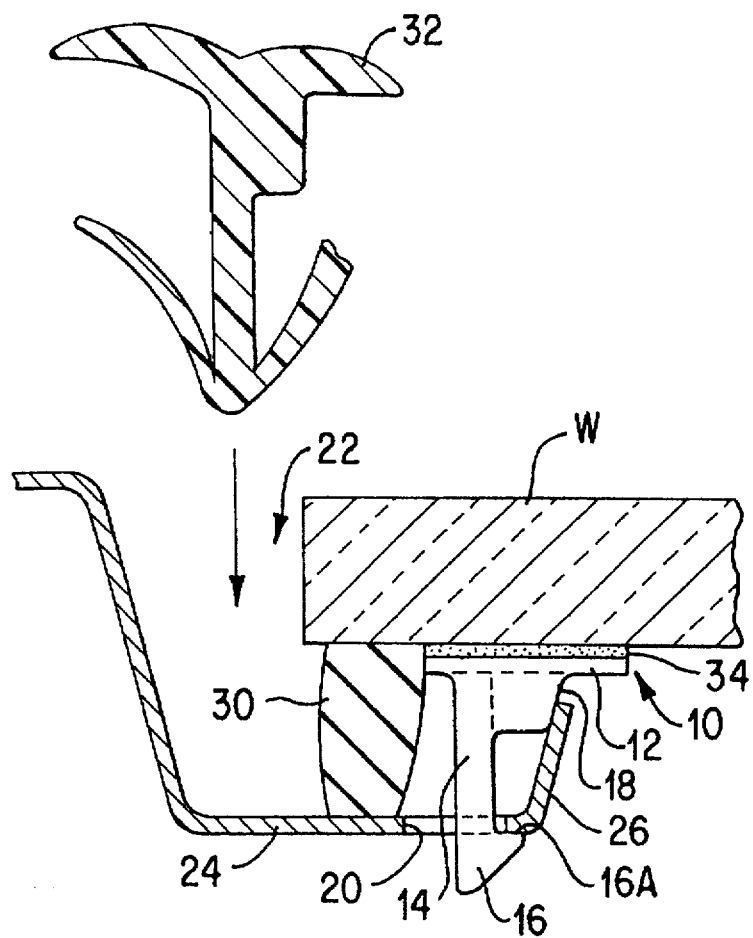
FIG. 3 is a sectional view for showing a mounting state of the glass plate holding device according to the first embodiment.

As shown in FIGS. 1 to 3, a glass plate holding device 10 according to a first embodiment of the invention is provided with a rectangular base plate 12 to be attached to a glass plate or window glass W of an automobile by a two-face tape 34.

At a center of the base plate 12 on a face opposite to a face where the base plate 12 is attached to the glass plate W, a plate-like thick leg 14 is provided to project perpendicularly therefrom. The leg 14 has, at a forward end thereof, a pawl 16 projecting laterally from the leg 14 and having a flat engaging face 16A. Also, the leg 14 has, at a base end thereof, two pressing members 18 in a shape of a block for reinforcing a connecting portion between the leg 14 and the base plate 12.

On the other hand, a flange 24 is formed around an opening 22 of, for example, an automobile, and the flange 24 is bent to form a projecting portion 26 projecting toward the glass plate W. On both sides of the projecting portion 26, two notches 28 are formed.

In a portion of the flange 24 where the projecting portion 26 is positioned, a rectangular mounting hole 20 is provided. The mounting hole 20 is formed larger than the pawl 16 of the glass plate holding device 10 to allow a positional relative error between the opening 22 and the glass plate W. A back side of a hole edge of the mounting hole 20 engages the engaging face 16A of the pawl 16.

Next, a procedure for attaching the glass plate W by using the glass plate holding device 10 according to the embodiment is explained.

The two glass plate holding devices 10 are attached to an upper edge of the glass plate or window glass W with a two-face tape. Then, an adhesive 30 is applied onto a peripheral edge of the glass plate W. While the glass plate W is held by hand, the pawls 16 are inserted into the mounting holes 20 and the glass plate W is positioned, so that the glass plate W is fitted into the opening 22.

Under a condition where the glass plate W is fitted into the opening 22, the engaging face 16A of the pawl 16 is engaged with a back face of the hole edge of the mounting hole 20. Therefore, even if an inner pressure in an interior of the automobile is increased by opening and closing the door, the glass plate W is not lifted and the glass plate W is fixed to an accurate position. Also, since the pressing members 18 provided on the base end side of the leg 14 abut against a forward edge face of the projecting portion 26, the glass plate W does not fall or slip down from the installation position by a weight of itself. Incidentally, since the weight of the glass plate W acts on the leg 14 reinforced by the pressing members 18, the leg 14 does not deform.

Finally, a clearance or space between the glass plate W and the opening 22 is filled with molding.

Next, a glass plate holding device according to a second embodiment is explained.

Figure 4:
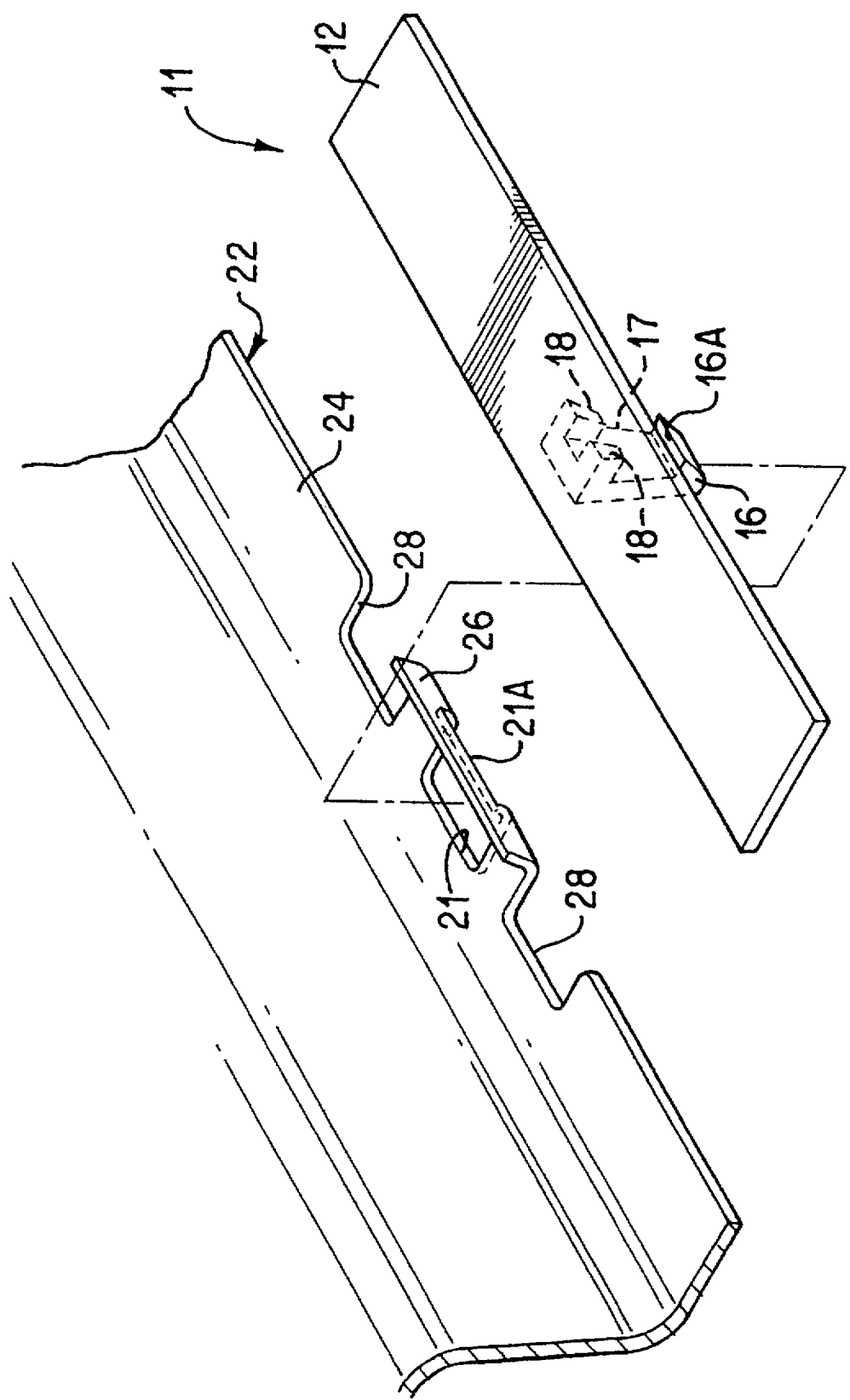
FIG. 4 is a perspective view for showing a relationship between a glass plate holding device and an opening of an automobile according to a second embodiment of the invention.
Figure 5:
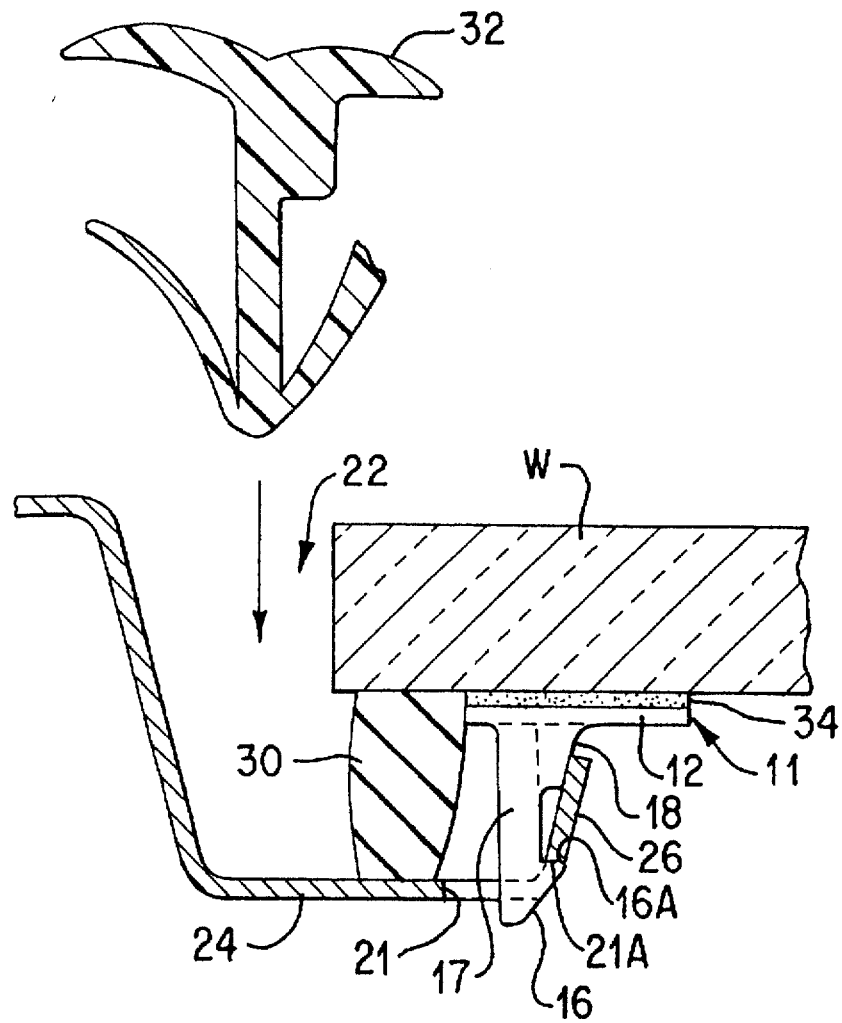
FIG. 5 is a sectional view for showing a mounting state of the glass plate holding device according to the second embodiment.

In the second embodiment, as shown in FIGS. 4 and 5, the mounting hole 21 extends to a center of the projecting portion 26, and the engaging face 16A of the pawl 16 is engaged with an upper edge portion 21A of the mounting hole 21. Therefore, an engaging position of the pawl 16 is located close to the glass plate W, so that a length of the leg 17 can be shortened, and the strength of the whole glass plate holding device 11 can be improved. Incidentally, if a plate working is considered, the mounting hole in the first embodiment can be formed easier than that in the second embodiment.

Next, a glass plate holding device 15 of a third embodiment is explained.

Figure 6:
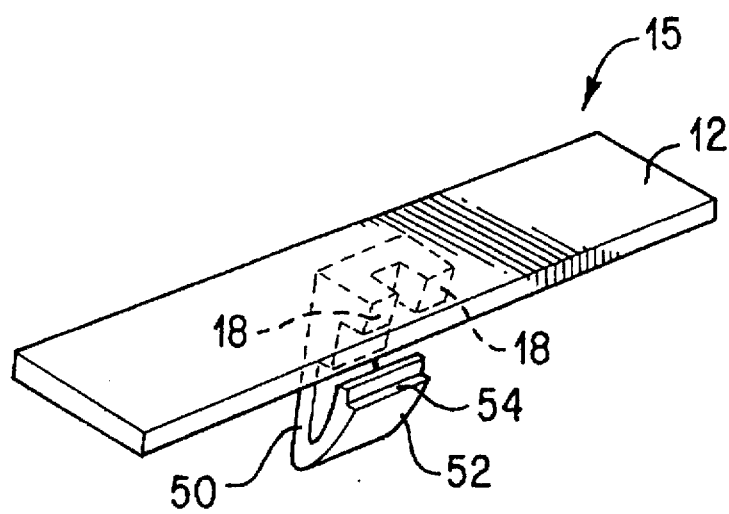
FIG. 6 is a perspective view for showing a glass plate holding device according to a third embodiment of the invention.
Figure 7:
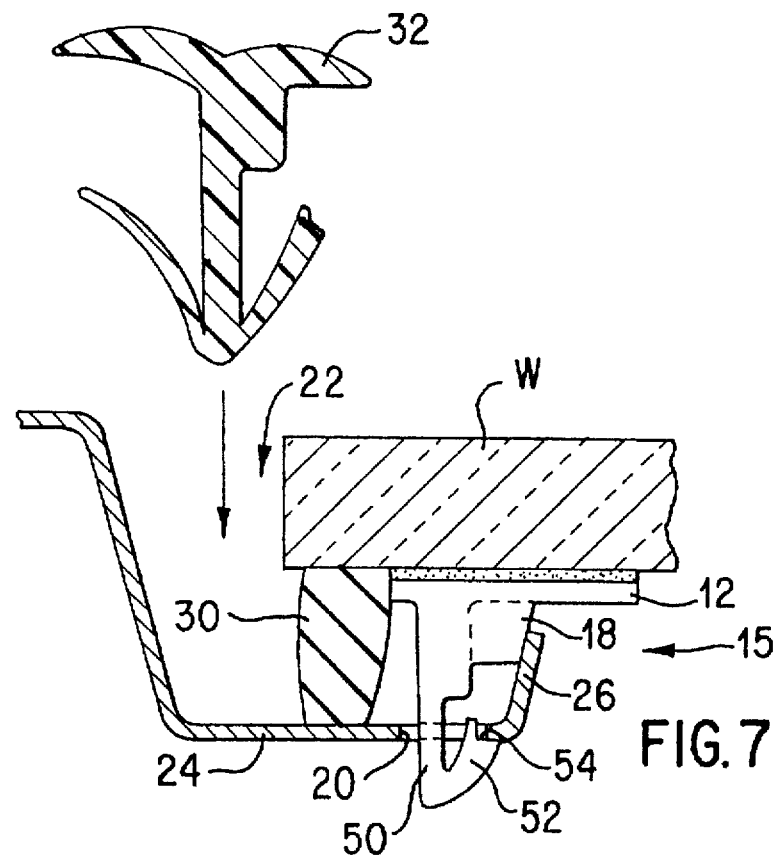
FIG. 7 is a sectional view for showing a mounting state of the glass plate holding device according to the third embodiment.
Figure 8:
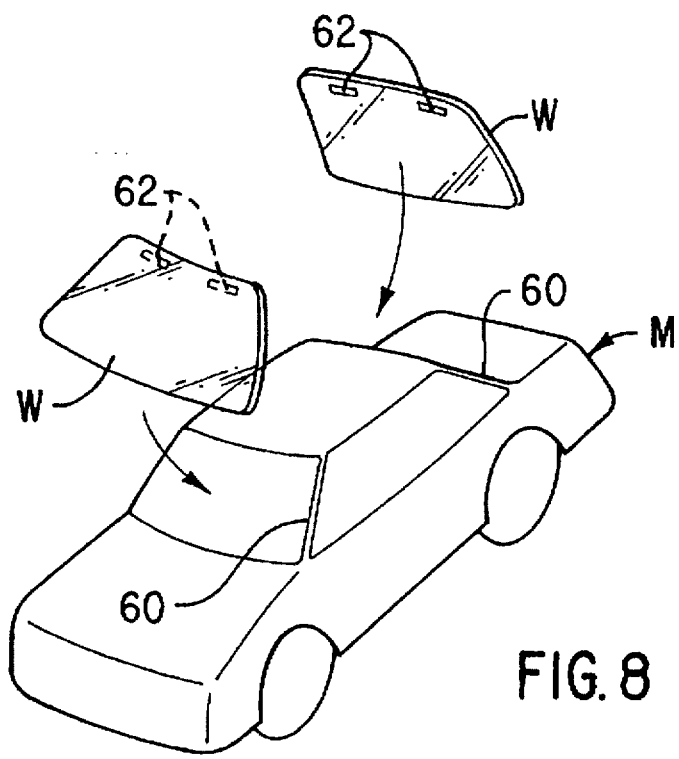
FIG. 8 is a perspective view for showing a glass plate to be fitted into the opening.
Figure 9:
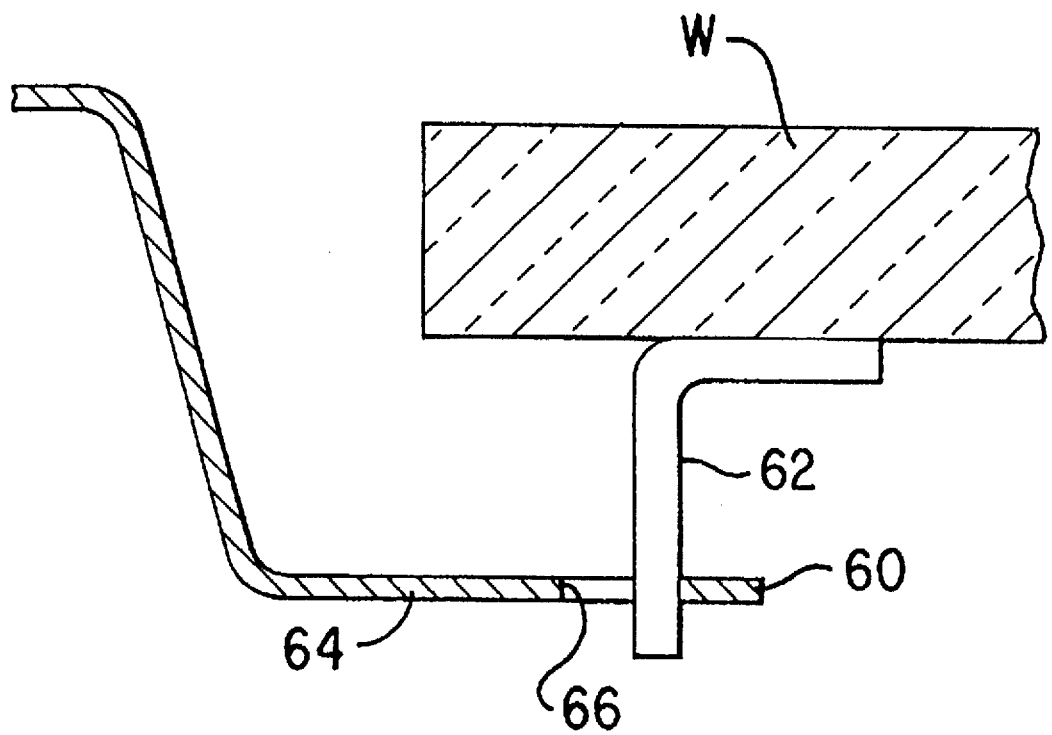
FIG. 9 is a sectional view for showing a mounting state of a conventional glass plate holding device.

As shown in FIGS. 6 and 7, in the third embodiment, a leg 50 has a pawl or pawl piece 52 diagonally extending from a forward edge of the leg 50 toward the base plate, and the pawl piece 52 has a step portion 54 at a forward edge thereof.

When the leg 50 is inserted into the mounting hole 20, the pawl piece 52 hits a hole edge of the mounting hole 20, and the pawl piece 52 bends. Since the pawl piece 52 bends easily, less inserting force is required. Also, when the pawl piece 52 passes through the mounting hole 20 and the pawl piece 52 returns to its original position by elasticity, the step portion 54 provided at the forward edge is engaged with the hole edge of the mounting hole 20. Thus, an extracting force required when the leg 50 is taken out from the hole 20 becomes large to thereby positively prevent lifting of the glass plate W.

Since the present invention is structured as described above, lifting and slipping of the glass plate from the flange can be prevented until the adhesive is cured.

While the invention has been explained with reference to the specific embodiments of the invention, the explanation is illustrative, and the invention is limited only by the appended claims.

What is claimed is:

1. A glass plate holding device for holding a glass plate in an opening of a body portion, comprising:

a base plate to be attached to the glass plate;

a leg having a base end and a forward end, said leg being fixed to the base plate at the base end and projecting in a direction away from the base plate;

at least one pressing member provided at one side of the base end of the leg, said pressing member reinforcing the leg at the base end and being adapted to abut against a flange of the body portion so that an edge portion of the glass plate is supported by the pressing member, and a pawl formed at the forward end of the leg and extending from the leg laterally at a side same as the at least one pressing member, said pawl having an engaging face parallel to the base plate and being adapted to enter into a mounting hole provided in the flange and engaging an edge of the mounting hole to prevent movement of the glass plate in a direction away from the flange.

2. A glass plate holding device according to claim 1, wherein said leg extends substantially perpendicularly from the base plate.

3. A glass plate holding device according to claim 1, wherein said pawl extends diagonally from the forward end of the leg to the base plate and includes a step portion formed at a forward edge of said pawl, said step portion engaging the edge of the mounting hole.

4. A glass plate holding device according to claim 3, further comprising at least one pressing member provided at the base end of the leg, said pressing member reinforcing the leg at the base end.

5. A combination of a body portion with an opening, and a glass plate holding device for holding a glass plate into the opening of the body portion, wherein said body portion includes a flange around the opening; a mounting hole formed in the flange; and a projecting portion extending upwardly from the flange; and said glass plate holding device includes a base plate to be attached to the glass plate; a leg having a base end and a forward end, said leg being fixed to the base plate at the base end and projecting in a direction away from the base plate; at least one pressing member provided at the base end of the leg, said pressing member abutting against the projecting portion when the leg is inserted into the mounting hole; and a pawl formed at the forward end of the leg, said pawl being entered into the mounting hole in the flange and engaging an edge of the mounting hole to prevent movement of the glass plate.

6. A combination according to claim 5, wherein said mounting hole extends from the flange to a portion of the projecting portion to shorten a length of the leg.

7. A glass plate holding device according to claim 1, wherein said at least one pressing member abuts against a projecting portion of the flange, and the leg and the at least one pressing member supports an upper circumferential edge portion of the glass plate.

8. A glass plate holding device according to claim 7, wherein said at least one pressing member includes two members spaced apart from each other and located at corner portions of the leg.

* * * * *